(12) United States Patent
Danling

(10) Patent No.: US 12,075,732 B2
(45) Date of Patent: Sep. 3, 2024

(54) STRIPER ARRANGEMENT FOR STRIPING A LAWN AND A ROBOTIC WORK TOOL COMPRISING THE STRIPER ARRANGEMENT

(71) Applicant: HUSQVARNA AB, Huskvarna (SE)

(72) Inventor: Anders Danling, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 770 days.

(21) Appl. No.: 17/276,710

(22) PCT Filed: Sep. 5, 2019

(86) PCT No.: PCT/SE2019/050831
§ 371 (c)(1),
(2) Date: Mar. 16, 2021

(87) PCT Pub. No.: WO2020/067953
PCT Pub. Date: Apr. 2, 2020

(65) Prior Publication Data
US 2022/0022386 A1 Jan. 27, 2022

(30) Foreign Application Priority Data
Sep. 27, 2018 (SE) .................................. 1851149-3

(51) Int. Cl.
*A01G 20/30* (2018.01)
*A01B 45/00* (2006.01)
(Continued)

(52) U.S. Cl.
CPC .............. *A01G 20/30* (2018.02); *A01B 45/00* (2013.01); *A01D 34/008* (2013.01); *A01D 43/00* (2013.01); *A01D 2101/00* (2013.01)

(58) Field of Classification Search
CPC ...... A01G 20/30; A01B 45/00; A01D 34/008; A01D 34/001; A01D 34/835; A01D 43/00;
(Continued)

(56) References Cited

U.S. PATENT DOCUMENTS 1,754,741 A * 4/1930 Cobb ..................... A01D 34/62
56/DIG. 18
2,476,526 A * 7/1949 Badlat .................... A01D 67/00
15/82
(Continued)

FOREIGN PATENT DOCUMENTS

CA 3116625 A1 * 6/2020 ........... A01B 69/008
CN 2779840 Y 5/2006
(Continued)

OTHER PUBLICATIONS

International Search Report and Written Opinion for International Application No. PCT/SE2019/050831 mailed Nov. 12, 2019.
(Continued)

*Primary Examiner* — Arpad Fabian-Kovacs
(74) *Attorney, Agent, or Firm* — Burr & Forman LLP

(57) ABSTRACT

A striper arrangement (200) for striping a lawn (1) configured to be arranged on a robotic work tool (100). The striper arrangement (200) comprises a striper mat (10) and a holding arrangement (300) for holding the striper mat (10) in contact with a N surface of a lawn (1) and is configured such that the striper mat (10) is movable in upwards and downwards direction; and further configured to bias the striper mat (10) in downwards direction by a biasing force (BF), such that movement of the striper mat (10) in upwards direction is restricted until a counter force (CF) exerted by the striper mat (10) onto the holding arrangement (300) exceeds the biasing force (BF). The counterforce (CF) is the force exerted by the striper mat (10) onto the holding
(Continued)

arrangement (300) when the striper mat (10) transits from a convex bent shape to a concave bent shape or vice versa. A robotic work tool 100 comprising a striper arrangement (200) for striping a lawn (1).

12 Claims, 4 Drawing Sheets

(51) Int. Cl.
 *A01D 34/00*  (2006.01)
 *A01D 43/00*  (2006.01)
 *A01D 101/00*  (2006.01)

(58) Field of Classification Search
 CPC ............ A01D 43/006; A01D 2101/00; A63C 19/065; A63C 2019/67
 See application file for complete search history.

(56) References Cited

U.S. PATENT DOCUMENTS

| | | | | |
|---|---|---|---|---|
| 2,973,613 | A * | 3/1961 | William | F16P 3/08 |
| | | | | D15/17 |
| 3,555,793 | A * | 1/1971 | Chapman | A01D 34/828 |
| | | | | 56/17.4 |
| 3,727,386 | A * | 4/1973 | Jespersen | A01D 75/18 |
| | | | | 56/320.1 |
| 4,030,277 | A * | 6/1977 | Christopherson | A01D 34/828 |
| | | | | 56/320.1 |
| 4,134,249 | A * | 1/1979 | Wuerker | A01D 34/005 |
| | | | | 56/320.1 |
| 5,181,371 | A | 1/1993 | DeWorth | |
| 5,197,265 | A * | 3/1993 | Hiratsuna | A01D 34/005 |
| | | | | 56/12.9 |
| 5,447,021 | A * | 9/1995 | Plamper | A01D 75/20 |
| | | | | 56/320.1 |
| D395,900 | S * | 7/1998 | Shannon | D15/28 |
| 6,207,092 | B1 * | 3/2001 | Kulkaski | B29C 48/08 |
| | | | | 264/173.17 |
| 6,289,660 | B1 * | 9/2001 | Martinez | A01D 34/84 |
| | | | | 56/DIG. 20 |
| 6,688,094 | B2 * | 2/2004 | Berndt | A01D 34/62 |
| | | | | 56/7 |
| 7,024,845 | B2 * | 4/2006 | Kallevig | A01D 43/00 |
| | | | | 56/17.4 |
| 8,112,976 | B1 * | 2/2012 | Kallevig | A01D 43/00 |
| | | | | 56/16.7 |
| 8,522,518 | B2 * | 9/2013 | Hirose | A01D 34/828 |
| | | | | 56/320.1 |
| 9,730,381 | B2 * | 8/2017 | Fichera | A01D 34/001 |
| 2002/0152734 | A1 | 10/2002 | Vanderipe | |
| 2003/0230067 | A1 | 12/2003 | Weinlader | |
| 2005/0038578 | A1 | 2/2005 | McMurtry et al. | |
| 2005/0066642 | A1 * | 3/2005 | Sugden | A01D 34/001 |
| | | | | 56/1 |
| 2005/0268586 | A1 | 12/2005 | Kallevig et al. | |
| 2008/0053672 | A1 * | 3/2008 | Alston | A01D 43/12 |
| | | | | 172/21 |
| 2009/0113864 | A1 | 5/2009 | Eavenson, Sr. et al. | |
| 2012/0023882 | A1 | 2/2012 | Hamburg et al. | |
| 2015/0096278 | A1 | 4/2015 | Sprinkmann et al. | |
| 2015/0201554 | A1 * | 7/2015 | McCarthy | A01D 43/00 |
| | | | | 56/14.7 |
| 2022/0361402 | A1 * | 11/2022 | Fugett | A01D 43/10 |

FOREIGN PATENT DOCUMENTS

| | | | | |
|---|---|---|---|---|
| CN | 2867829 | Y | 2/2007 | |
| CN | 101904245 | A | 12/2010 | |
| CN | 102204452 | A | 10/2011 | |
| CN | 205794094 | U | 12/2016 | |
| CN | 205961841 | U | 2/2017 | |
| CN | 106612901 | A | 5/2017 | |
| CN | 106888669 | A * | 6/2017 | ........... A01D 34/416 |
| CN | 107771433 | A | 3/2018 | |
| DE | 202009018621 | U1 | 5/2012 | |
| EP | 1922912 | A1 | 5/2008 | |
| EP | 2371201 | B1 | 9/2012 | |
| EP | 2818034 | A1 | 12/2014 | |
| EP | 3232290 | A1 | 10/2017 | |
| GB | 2443785 | A | 5/2008 | |
| JP | 2014050366 | A * | 3/2014 | ............ A01B 45/04 |
| WO | WO-2008042894 | A2 * | 4/2008 | ............ A01D 42/00 |

OTHER PUBLICATIONS

Office Action and Search Report for Swedish Application No. 1851149-3 mailed on Mar. 13, 2019.

Juschkat, K., "Intelligenter Rasentraktor malit autonom", Available Online at: https://www.konstruktionspraxis.vogel.de/Intelligenter-rasentraktor-maeht-autonom-a-541062/, Jul. 11, 2016, 3 pages.

* cited by examiner

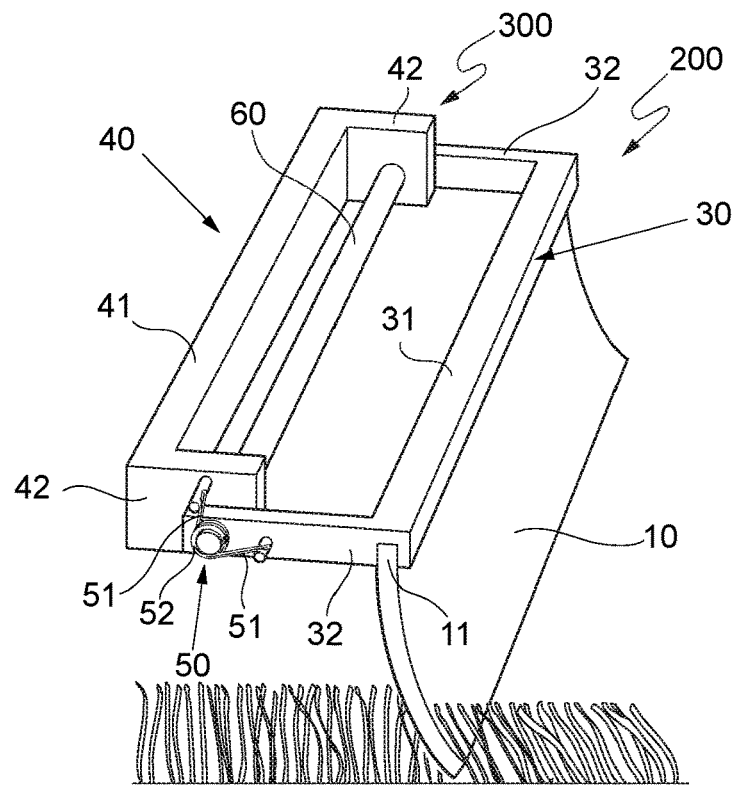
Fig.2a
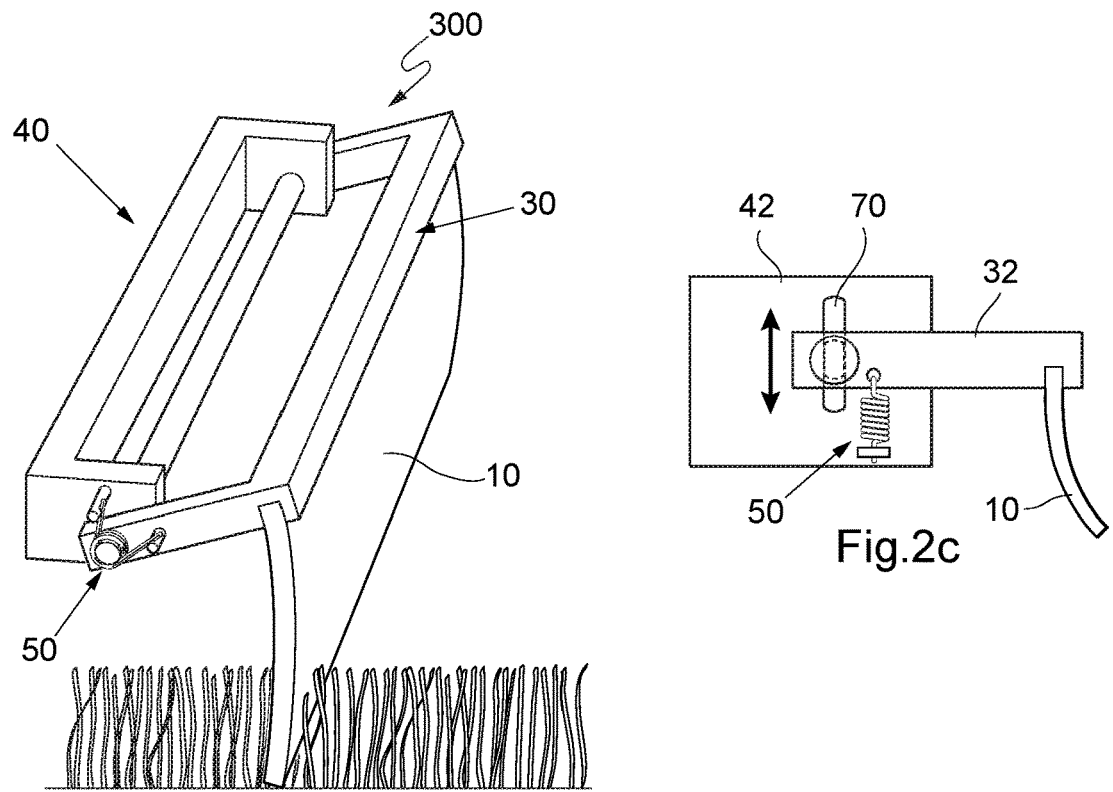
Fig.2b
Fig.2c

STRIPER ARRANGEMENT FOR STRIPING A LAWN AND A ROBOTIC WORK TOOL COMPRISING THE STRIPER ARRANGEMENT

TECHNICAL FIELD

The present disclosure relates to a striper arrangement for striping a lawn configured to be arranged on a robotic work tool, such as a lawn mower.

The present disclosure also relates to a robotic work tool, such as a lawn mower comprising a striper arrangement.

BACKGROUND ART

Lawn striping is a technique for creating patterns on lawns by flattening one row of grass in one direction and an adjacent row of grass in another direction. Typically, lawn striping is applied on sports fields such as football- or baseball fields in which the grass on the entire field is striped in parallel rows of grass that is flattened in opposite directions.

Conventionally, striping of lawns is performed by flattening the grass with a rubber mat that is attached to a ride-on lawn mower or a tractor that is driven by a person.

Robotic lawn mowers are increasingly used for maintaining lawns and sports fields. Robotic lawn mowers are advantageous for these tasks since they operate autonomous and thus reduce the need and cost for personnel operating lawn mowers.

However, it has shown that when robotic lawn mowers are equipped with striper mats, the striper mat may impede the maneuvering of the robotic lawn mower. For example, the striper mat may impede the robotic lawn mower when the robotic lawn mower changes driving direction from forward to reverse.

FIG. 5 shows schematically a situation where a robotic lawn mower 100 with a striper mat 10 reverses driving direction from forward to backwards. During this maneuver, friction between the edge of the striper mat 10 and the ground 1 causes the striper mat 10 to transit from a convex bent shape to a concave bent shape. During this transition, the striper mat 10 exerts a counter force onto the robotic lawn mower 100 which impedes the rearward motion of robotic lawn mower and results in that the robotic lawn mower is lifted from the ground by the striper mat.

There is a need for an improved lawn striping arrangement for robotic work tools, such as robotic lawn mowers.

SUMMARY OF THE DISCLOSURE

It is therefore an object of the present disclosure to provide a striper arrangement for striping a lawn configured to be arranged on a robotic work tool that solves or at least mitigates one of the problems of the prior-art. It is an object of the present disclosure to provide a striper arrangement that allows for smooth maneuvering of the robotic work tool that comprises the striper arrangement. A further object of the present disclosure is to provide a striper arrangement that is robust and of simple construction. Yet a further object of the present disclosure is the provide a striper arrangement that may be realized at low cost.

Yet a further object of the present disclosure is to provide a robotic work tool, such as a robotic lawnmower, comprising a striper arrangement for striping a lawn.

According to a first aspect of the present disclosure at least one of the aforementioned objects is solved by a striper arrangement for striping a lawn configured to be arranged on a robotic work tool; wherein the striper arrangement comprises a striper mat and a holding arrangement for holding the striper mat in contact with a surface of a lawn, wherein the holding arrangement is configured to be joined to, or be a part of, the robotic work tool, wherein the holding arrangement is configured such that:

the striper mat is movable in upwards and downwards direction; and further configured to bias the striper mat in downwards direction by a biasing force, such that movement of the striper mat in upwards direction is restricted until a counter force exerted by the striper mat onto the holding arrangement exceeds the biasing force.

The striper arrangement according to the disclosure provides an advantage when the robotic work tool changes between forward driving direction and reverse, for example, during a backward turn. According to the present disclosure, the striper mat is movable in upwards/downwards direction but biased downwards so that the striper mat applies a sufficient pressure onto the lawn. Therefore, when the striper mat transits from a convex bent shape to a concave bent shape during the backward turn, the striper mat moves upwards as soon as the counter force from the striper mat exceeds the biasing force the striper arrangement. This allows the bent striper mat to straighten out, which in turn allows the striper mat to smoothly transit from convex to concave bent shape. Thus, the striper arrangement of the present disclosure, allows free maneuverability of the robotic work tool between forward and rearward driving direction without impediment from the striper mat or that the striper mat lifts the robotic work tool.

The holding arrangement may comprise a striper mat holder that is joined to the striper mat and a striper mat holder attachment configured to be joined to, or be a part of, the robotic work tool. The striper mat holder may thereby be connected to the striper mat holder attachment such that the striper mat holder is movable in upwards/downwards direction. Preferably, the striper mat holder is pivotally coupled to the striper mat holder attachment such that the striper mat holder may pivot in upwards/downwards direction relative the striper mat holder attachment. In summary, this holding arrangement is simple, yet robust and reliable.

In detail, the striper mat holder attachment may comprise at least one elongate attachment part which is configured to, in use, extend from the robotic work tool. The striper mat holder may thereby comprise a central elongated portion which is joined to an upper edge of the striper mat and at least one elongated extension part which extends from the central portion and that is pivotally attached to the striper mat holder attachment by a pivot shaft.

The striper arrangement comprises a biasing element configured to provide the biasing force (BF) onto the striper mat. Typically, the biasing element is a spring element. The biasing element is preferably coupled to the striper mat holder and to the striper mat holder attachment. Spring elements are preferred since they are available in many forms and therefore may be easily integrated into the construction of the striper arrangement. Spring elements may readily be selected in dependency of their spring characteristics to fit various types of robotic work tools, striper mats and operating conditions.

Typically, the counterforce (CF) is the force exerted by the striper mat onto the holding arrangement when the striper mat transits from a convex bent shape to a concave bent shape or vice versa. The counter force (CF) may be determined by practical trials and used as basis for selecting a biasing element that provides a suitable biasing force (BF).

According to a further aspect, the present disclosure relates to a robotic work tool comprising a striper arrangement according to the first aspect.

BRIEF DESCRIPTION OF THE DRAWINGS

FIG. 2a-2c: Schematic drawings of striper arrangement according to the first embodiment of the present disclosure.

DEFINITIONS

When, in the present disclosure, reference is made to directions such as "upwards" or "downwards" it is intended that these directions are in relation to the ground surface that the robotic work tool is operating on. Thus, "upwards" is in direction substantially away from the ground surface and "downwards" is in direction substantially towards the ground surface.

DETAILED DESCRIPTION OF EMBODIMENTS

The robotic work tool according to the present disclosure will now be described more fully hereinafter. The robotic work tool according to the present disclosure may however be embodied in many different forms and should not be construed as limited to the embodiments set forth herein. Same reference numbers refer to same elements throughout the description.

Figure 1A:
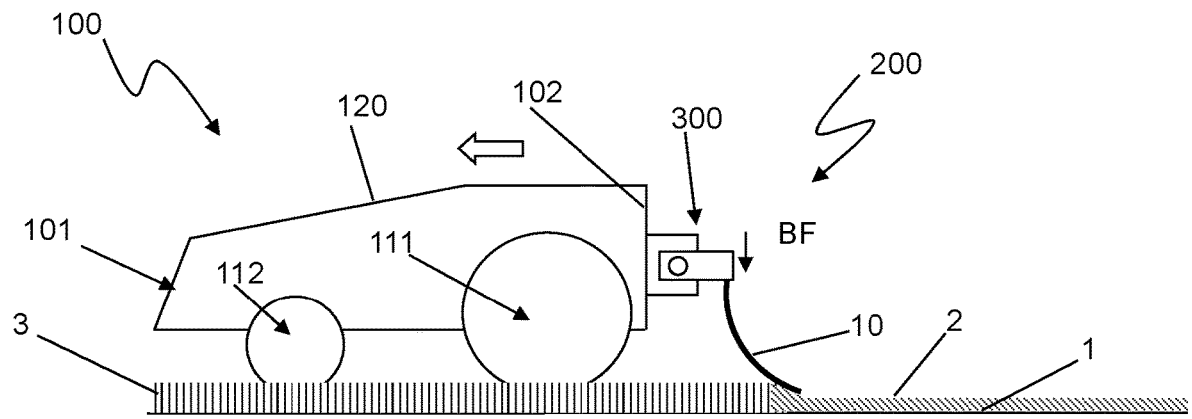
FIG. 1a-1d: Schematic drawings of a robotic work tool comprising a striper arrangement according to a first embodiment of the present disclosure.

FIG. 1a shows schematically a robotic work tool 100, embodied as a robotic lawn mower. The robotic work tool 100 is positioned on the surface of a lawn 1 and has a front 101 and a rear and comprises a pair of rear wheels 111, which may be propelled by a motor (not shown) a pair of front wheels 112 and a housing 120 which protects components of the robotic work tool such as motor, cutting tool, sensors and the controller for controlling the robotic work tool with e.g. regards to maneuvering performance. These parts will be described hereinafter with regards to FIGS. 3 and 4. In FIG. 1, the robotic work tool is moving in a forward driving direction indicated by arrow 5. That is, the front 101 of the robotic work tool 100 is facing in the driving direction.

The robotic work tool 100 comprises a striper arrangement 200 for striping the lawn 1. The striper arrangement 200 comprises a striper mat 10 and a holding arrangement 300 for holding the striper mat 10 in contact with the lawn 1. The holding arrangement 300 is arranged at the rear 102 of the robotic work tool 100, however alternatively it may be arranged at the front 101 of the robotic work tool. The striper mat is manufactured of flexible material such as a rubber material. For example, textile reinforced rubber. The striper mat may have an arbitrary width, for example 50 cm to create sufficiently wide stripes on the lawn. The thickness of the striper mat may be 6 mm. The length of the striper mat depends on dimensions of the robotic work tool and the position of the holder arrangement 300 on the robotic work tool. However, the length is adapted such that the striper mat 10 is bent into a concave/convex shape when striping the lawn 1. In FIG. 1, the striper mat 10 is trailed behind the robotic work tool 100. The grass 2 behind the striper mat 10 is thus flattened by and the grass 3 in front of striper mat 10 is un-flattened.

FIG. 2a shows the striper arrangement 200 in detail. Thus, the holding arrangement 300 is configured such that the striper mat 10 is movable in upwards- and downwards direction. In the embodiment shown in FIG. 2a, the holding arrangement 300 thereby comprises a striper mat holder 30 which comprises a central elongated portion 31 which is joined to the upper edge 11 of the striper mat 10 and a first and a second elongated extension part 32 that extends, e.g. orthogonally, from the central elongated portion 31. The striper mat holder may for example be manufactured by metal profiles having a square or rectangular cross-section. For example, steel or aluminum profiles. The width of the striper mat holder 30, i.e. the length of the central elongated portion 31 may correspond to the width of the striper mat 10. It is possible that the striper mat holder 30 comprises only one, or more than two, elongate extension parts 32 that extends from the central elongate portion 31.

The holding arrangement 300 further comprises a striper mat holder arrangement 40 which comprises a first and a second elongate attachment part 42 which is are configured to extend, i.e. protrude, from the robotic work tool 100. For example, from the rear 102 of the robotic work tool. Also, the first and the second elongate attachment part 42 may be manufactured of profiles of a suitable length and cross-section. For example, steel or aluminum profiles having a square or rectangular cross-section. The striper mat holder arrangement 40 may comprise a central elongated portion 41. The first and the second elongate attachment part 42 may thereby extend, e.g. orthogonally from opposite ends of the central elongated portion 41. The striper mat holder arrangement 40, may be attached to the robotic work tool 100 by e.g. bolts (not shown). In correspondence with the striper mat holder 30 it is possible that also the striper mat holder arrangement 40 comprises only one, or more than two elongate attachment parts 42 that may extend from the central elongate portion 41.

The striper mat holder 30 is movable connected to the striper mat holder attachment 40 such that the striper mat holder 30, and thus the striper mat 10, is movable in upwards, downwards direction. In the embodiment shown in FIG. 2 the striper mat holder 30 is pivotally connected, i.e. pivotally coupled, to the striper mat holder attachment 40. The first and second elongated extension portions 32 of the striper mat holder 30 are thereby pivotally coupled to a respective one of the first and the second elongated attachment part 42 of the striper mat holder attachment 40. The pivotal coupling of the striper mat holder 30 and the striper mat holder attachment 40 may be achieved by a pivot shaft 60 that extends through openings in the first and second elongated extension portions 32 of the striper mat holder 30 and through openings in the first and the second elongated attachment parts 42 of the striper mat holder attachment 40. Alternatively (not shown), one pivot shaft 60 may connect the first elongated extension portion 32 with the first elongated attachment part 42 and a second pivot shaft 60 may connect the second elongated extension portion 32 with the second elongated attachment part 42.

It is obvious that the striper mat holder 30 may be movable connected to the striper mat holder attachment 40 in other ways than described above. For example, the striper mat holder 30 may be arranged to translate vertically in the striper mat holder attachment 40. An example of such an arrangement is shown in FIG. 2c in which the first elongated extension portion 32 of the striper mat holder 30 is movable attached to a slot 70 that extends vertically in the first elongated attachment part 42 of the striper mat holder attachment 40.

The holding arrangement 300 is further configured to bias the striper mat bias the striper mat 10 in downwards direction by a biasing force (BF). The holder arrangement 300 thereby comprises a biasing element, 50 such as a spring element which is coupled to the striper mat holder attachment 40 and to the striper mat holder 30 such that the striper mat holder 30, and thus the striper mat 10, is biased downwards. By "biased" is thereby meant that a force is permanently applied onto the striper mat holder 30 and forces, i.e. presses the striper mat holder 30 downwards.

In FIG. 2a, the biasing element 50 is a torsion spring. The torsion spring is manufactured of steel wire and comprises a coiled middle section 51 and a first leg 52 and a second leg 53. The coiled middle section 51 is arranged around the pivot shaft 60 and the first leg 51 is attached to the first elongated attachment part 42 of the striper mat holder attachment 40. The other leg 52 of the torsion spring 50 is attached to the first elongated extension portion 32 of the striper mat holder 30. The torsion spring 50 is arranged such that the legs 51, 52 strive apart from each other and create a downwards directed biasing force on the striper mat holder 30.

It is obvious that the biasing force may be achieved in other ways. For example, the biasing element 50 may be a pressure spring, or a pneumatic spring or a piece of compressed rubber. The biasing element 50 may also be attached directly to the robotic work tool and coupled to the striper mat holder 30, or alternatively to the striper mat.

The biasing force (BF) restricts movement of the striper mat 10 in upwards direction until a counter force (CF) exerted by the striper mat 10 onto the holding arrangement 300 exceeds the biasing force (BF).

FIG. 2b shows the holding arrangement 300 in a situation in which the striper mat holder 30 is pivoted upwards by a counter force (CF) that is applied onto the striper mat. In FIG. 2b, the counter force (CF) exceeds the biasing force (BF) from the biasing element 50 and forces the striper mat holder 30 upwards.

Preferably, the biasing force BF is selected such that it is substantially equal to a counter force (CF) exerted by the striper mat 10 when the striper mat 10 transits from a convex bent shape to a concave bent shape, or vice versa.

This feature is in the following described with reference to FIGS. 1a-1d.

Figure 1B:
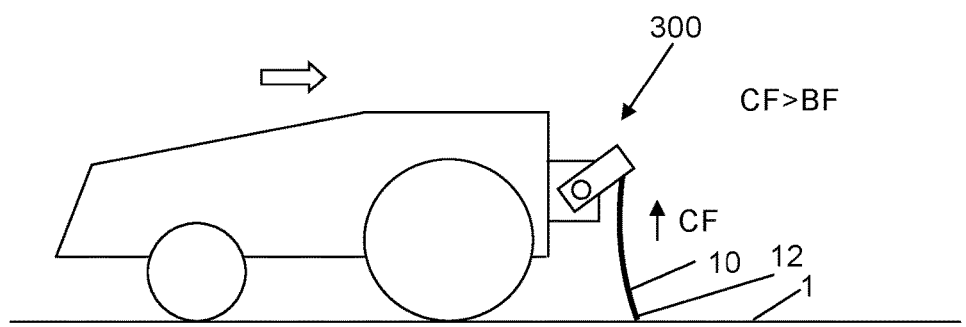
Figure 1C:
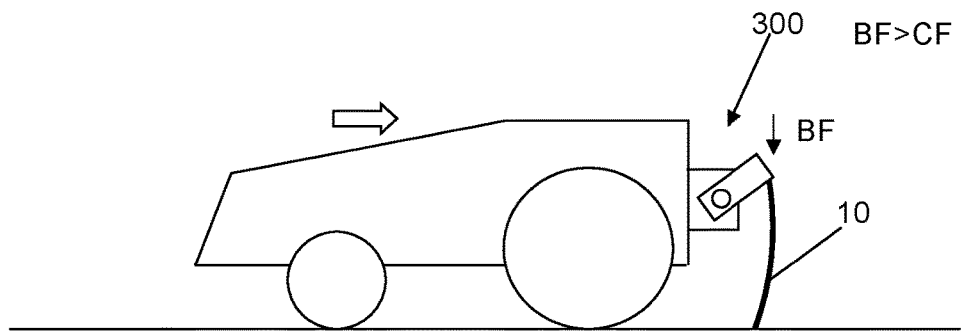
Figure 1D:
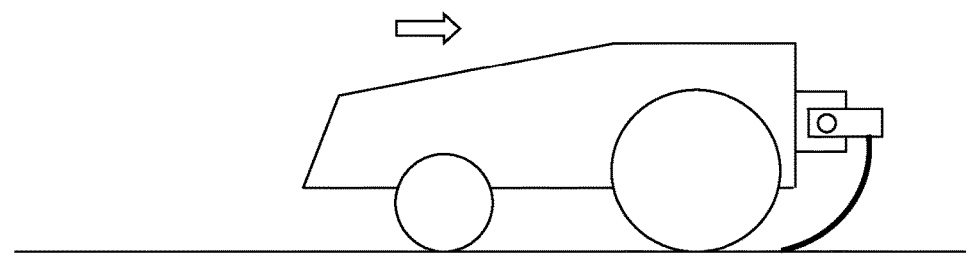

FIG. 1b shows a situation in which the robotic work tool 100 described under FIG. 1a has changed driving direction from forward to reverse to make a backward turn. In this situation, friction between the lower edge 12 of the concavely bent striper mat 10 and the surface of the lawn 1 prevents the striper mat 10 from sliding over the surface of the lawn. Since the slider mat 10 does not follow the rearward movement of the robotic work tool 100, a counter force (CF) starts immediately to build up in the flexible striper mat 10 as the striper mat 10 strives to transit from a concave bent shape into a convex bent shape. The counter force (CF) is exerted onto the holder arrangement 300, i.e. onto the striper mat holder 30 (see FIG. 2a) and exceeds the biasing force (BF). The striper mat holder 30 and thus the striper mat 10 is therefore allowed to move upwards which allows the striper mat 10 to smoothly transit, without any lifting of the robotic work tool 100, into a concave bent shape as shown in FIG. 1c. In this situation, the counter force (CF) decreases and the biasing force (BF) prevails and forces the striper mat 10 downwards to the state shown in FIG. 1d. The robotic work tool 100 may now complete the backwards turn. The procedure described above is repeated in inverted order when the robotic work tool 100 reverses driving direction from the rearward direction as shown in FIG. 1d to forward direction.

The counter force (CF) from the striper mat 10 may vary in dependency of e.g. dimension and material of the striper mat or operating conditions. However, the counter force (CF) produced during the transit between convex and concave shape of the striper mat 10 may be determined by practical trials. It may, for example, be measured with a potentiometer. It is then possible to use such measurements for providing a suitable biasing force, for example selecting a biasing element with appropriate spring characteristics.

Further Description of the Robotic Work Tool

Following is a description of further parts of the robotic work tool.

Figure 3:
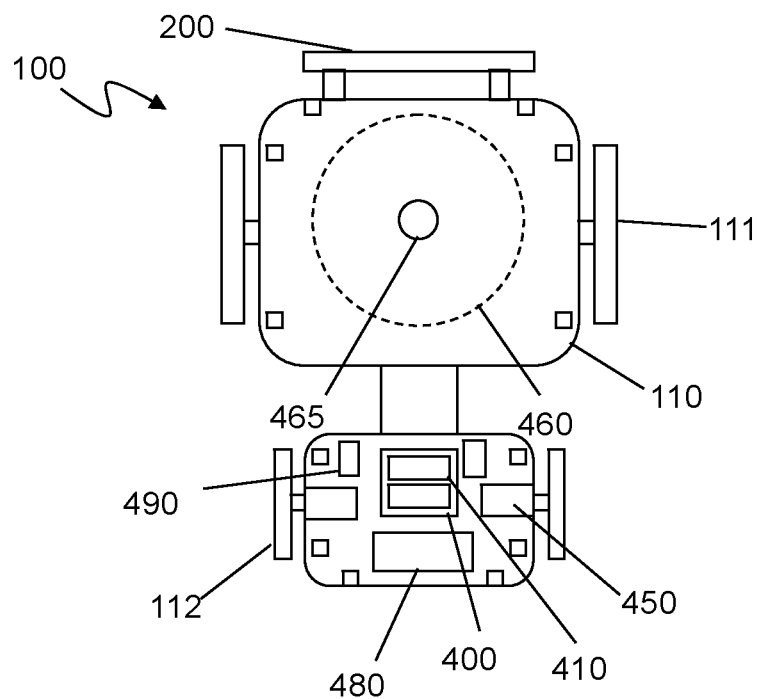
FIG. 3: A schematic drawing of a robotic work tool according to the present disclosure.

FIG. 3 shows a schematic overview of the robotic work tool 100, which is exemplified by a robotic lawnmower 100. The housing 120 has been omitted in order to not obscure other parts of the robotic work tool.

Thus, the robotic work tool 100 comprises a chassis 110 and pair of wheels. One pair of front wheels 112 is arranged in the front of the chassis 110 and one pair of rear wheels 111 is arranged in the rear of the chassis 110. At least some of the wheels 111, 112 are drivably connected to at least one electric motor 450. It is appreciated that while the description herein is focused on electric motors, combustion engines may alternatively be used possibly in combination with an electric motor. A striper arrangement 200 according to the present disclosure is arranged at the rear of the robotic lawn mower 100.

In the example of FIG. 3, each of the rear wheels 111 is connected to a respective electric motor 450. This allows for driving the rear wheels 150 independently of one another which, for example, enables steep turning.

The robotic work tool 100 also comprises a controller 400. The controller 400 may be implemented using instructions that enable hardware functionality, for example, by using executable computer program instructions in a general-purpose or special-purpose processor that may be stored on a computer readable storage medium (disk, memory etc.) 410 to be executed by such a processor. The controller 400 is configured to read instructions from the memory 410 and execute these instructions to control the operation of the robotic work tool 100 including, but not being limited to, the propulsion of the robotic work tool. The controller 400 may be implemented using any suitable processor or Programmable Logic Circuit (PLC). The memory 410 may be implemented using any technology for computer-readable memories such as ROM, RAM, SRAM, DRAM, FLASH, DDR, SDRAM or some other memory technology.

The robotic work tool 100, may comprise a grass cutting device 460, such as a rotating blade driven by a cutter motor 465. In the embodiment of FIG. 3 the grass cutting device 460 and the cutter motor 465 are arranged in the front carriage 101. The cutter motor 465 is connected to the controller 400 which enables the controller 400 to control the operation of the cutter motor 465. The controller 400 may also be configured to determine the load exerted on the rotating blade, by for example measure the power delivered to the cutter motor 465 or by measuring the axle torque exerted by the rotating blade. The robotic work tool 100 also has (at least) one battery 480 for providing power to the motors 450 and the cutter motor 465. The robotic work tool may further have a satellite navigation device 490, such as a GPS-device, which may be used by the robotic lawn work tool 100 to navigate within a work area.

Figure 4:
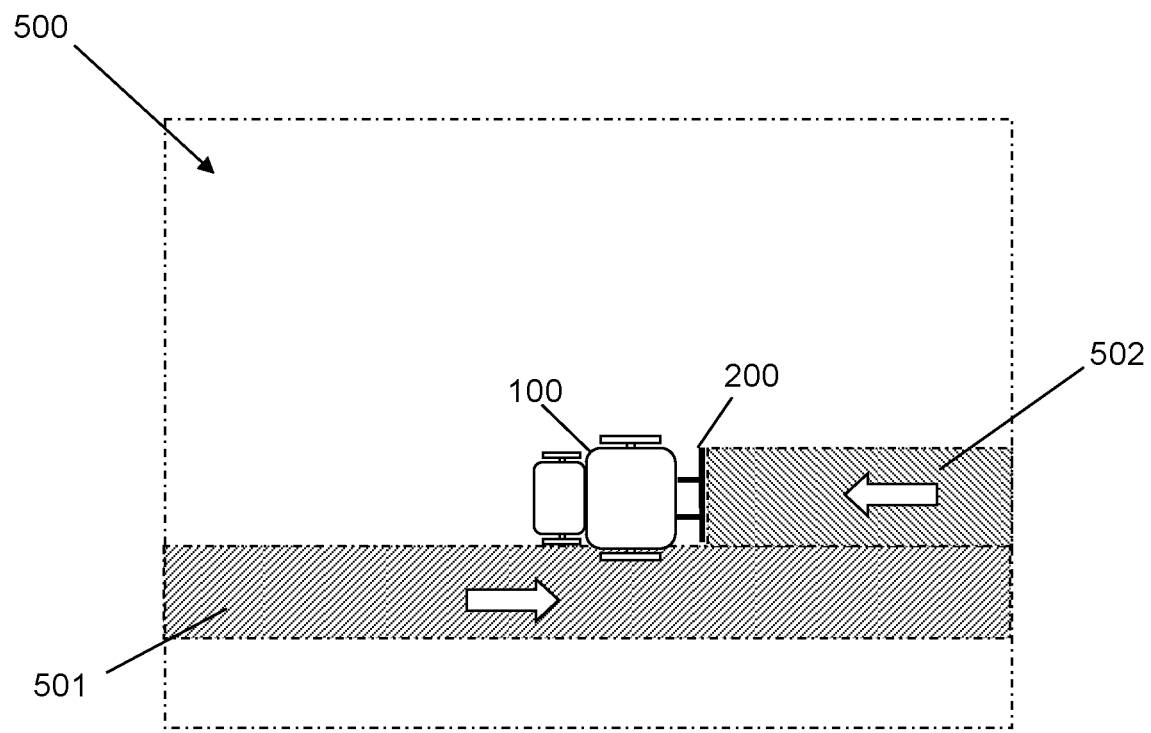
FIG. 4: A schematic drawing of a robotic work tool according the present disclosure operating on a lawn.
Figure 5:
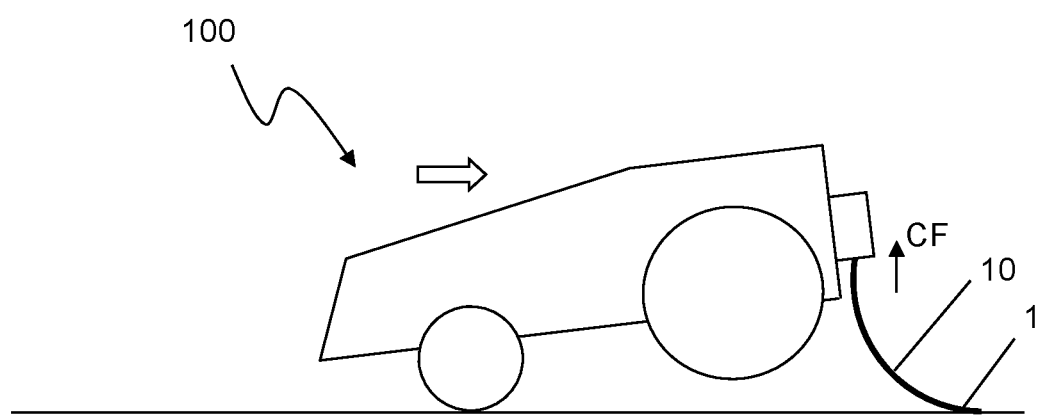
FIG. 5: A schematic drawing of a robotic work tool having a fixed striper mat.

FIG. 4 shows the robotic work tool 100 in a striping operation within a work area 500 in the form of a lawn. Thus, the robotic work tool 100 may be configured to navigate, using information received by satellite navigation device 490, in the work area 500. The robotic work tool 100 is thereby configured to run a distance in a first direction over the work area 500 and thereby stripe a first section 501 of the work area 500. The robotic work tool 100 is further configured to make a 180° turn and run a distance adjacent the first section 501, possibly with an overlap, such that a second section 502 of the work area 500 is striped.

The invention claimed is:

1. A striper arrangement to stripe a lawn of a robotic work tool, the striper arrangement comprising:
   a striper mat; and
   a holding arrangement to hold holding the striper mat in contact with a surface of a lawn,
   wherein the holding arrangement is joined to, or part of, the robotic work tool,
   wherein the holding arrangement enables the striper mat to move in an upwards direction and a downwards direction; and biases the striper mat in the downwards direction by a biasing force,
   wherein movement of the striper mat in the upwards direction is restricted until a counter force exerted by the striper mat onto the holding arrangement exceeds the biasing force,
   wherein the counter force is a force exerted by the striper mat onto the holding arrangement when the striper mat transits from a convex bent shape to a concave bent shape or vice versa, and
   wherein the biasing force is set to be substantially equal to the counter force when the striper mat transits from the convex bent shape to the concave bent shape or vice versa.

2. The striper arrangement according to claim 1, wherein the holding arrangement comprises a striper mat holder joined to the striper mat and a striper mat holder attachment joined to, or part of, the robotic work tool, and
   wherein the striper mat holder is connected to the striper mat holder attachment, and
   wherein the striper mat holder is moves in the upwards direction and the downwards direction.

3. The striper arrangement according to claim 2, wherein the striper mat holder is pivotally coupled to the striper mat holder attachment, and
   wherein the striper mat holder pivots in the upwards direction and the downwards direction relative the striper mat holder attachment.

4. The striper arrangement according to claim 3, wherein the striper mat holder attachment comprises at least one elongate attachment part which, responsive to the striper holder attachment being in use, extend from the robotic work tool,
   wherein the striper mat holder comprises a central elongated portion which is joined to an upper edge of the striper mat, and
   wherein at least one elongated extension part that extends from the central portion and that is pivotally attached to the striper mat holder attachment by a pivot shaft.

5. The striper arrangement according to claim 1, further comprising a biasing element to provide the biasing force onto the striper mat.

6. The striper arrangement according to claim 5, wherein the biasing element is a spring element.

7. The striper arrangement according to claim 5, wherein the biasing element is coupled to the striper mat holder and to the striper mat holder attachment.

8. The striper arrangement according to claim 1, wherein the striper mat is flexible.

9. A robotic work tool comprising a striper arrangement, the striper arrangement comprising:
   a striper mat; and
   a holding arrangement to hold holding the striper mat in contact with a surface of a lawn,
   wherein the holding arrangement is joined to, or part of, the robotic work tool,
   wherein the holding arrangement enables the striper mat moves in an upwards direction and a downwards direction and biases the striper mat in the downwards direction by a biasing force,
   wherein movement of the striper mat in the upwards direction is restricted until a counter force exerted by the striper mat onto the holding arrangement exceeds the biasing force,
   wherein the counterforce is a force exerted by the striper mat onto the holding arrangement when the striper mat transits from a convex bent shape to a concave bent shape or vice versa,
   wherein the holding arrangement comprises a striper mat holder joined to the striper mat and a striper mat holder attachment joined to, or part of, the robotic work tool,
   wherein the striper mat holder is pivotally coupled to the striper mat holder attachment,
   wherein the striper mat holder pivots in the upwards direction and the downwards direction relative the striper mat holder attachment,
   wherein a biasing member provides the biasing force, and
   wherein the biasing member is not coaxial along an axis by which the striper mat holder pivots.

10. The robotic work tool according to claim 9, wherein the robotic work tool has a chassis with a front and a rear, front wheels and rear wheels and a housing, wherein the striper arrangement is arranged at the rear or the front of the robotic work tool.

11. The robotic work tool according to claim 9, wherein the robotic work tool is a robotic lawnmower.

12. A robotic lawnmower comprising a striper arrangement, the striper arrangement comprising:
   a striper mat;
   a biasing element to provide a biasing force onto the striper mat; and
   a holding arrangement to hold the striper mat in contact with a surface of a lawn,
   wherein the holding arrangement is joined to, or part of, the robotic work tool,
   wherein the holding arrangement enables the striper mat to move in an upwards direction and a downwards direction and biases the striper mat in the downwards direction by a biasing force,
   wherein movement of the striper mat in the upwards direction is restricted until a counter force exerted by the striper mat onto the holding arrangement exceeds the biasing force,
   wherein the holding arrangement further comprises a striper mat holder operably coupled to the striper mat and a striper mat holder attachment,
   wherein the striper mat holder is operably coupled to the striper mat holder attachment, wherein the striper mat holder moves in the upwards direction and the downwards direction, wherein responsive to the robotic lawnmower changing between a forward movement direction and a reverse movement direction, the counter force forces the striper mat holder to move in the upwards direction, and wherein responsive to the counter force forcing the striper mat holder to move in the upwards direction, the striper mat transitions smoothly between a convex bent shape and a concave bent shape.

* * * * *

UNITED STATES PATENT AND TRADEMARK OFFICE
CERTIFICATE OF CORRECTION

| | | |
|---|---|---|
| PATENT NO. | : 12,075,732 B2 | Page 1 of 1 |
| APPLICATION NO. | : 17/276710 | |
| DATED | : September 3, 2024 | |
| INVENTOR(S) | : Anders Danling | |

It is certified that error appears in the above-identified patent and that said Letters Patent is hereby corrected as shown below:

In the Claims

In Column 7, Claim 2, Line 46, "the striper mat holder is moves" should read --the striper mat holder moves--.

Signed and Sealed this
Seventh Day of January, 2025

Derrick Brent
*Acting Director of the United States Patent and Trademark Office*